United States Patent
Podhajecki et al.

(10) Patent No.: US 6,533,459 B2
(45) Date of Patent: Mar. 18, 2003

(54) ADJUSTABLE, SELF-ALIGNING, LINEAR ROLLER BEARING

(75) Inventors: Stephen T. Podhajecki, Norfolk, CT (US); John H. Hubbard, Torrington, CT (US); Daniel R. McLarty, Burlington, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/774,348

(22) Filed: Jan. 31, 2001

(65) Prior Publication Data
US 2002/0102037 A1 Aug. 1, 2002

(51) Int. Cl.⁷ ............................................. F16C 29/12
(52) U.S. Cl. ........................................ 384/57; 384/56
(58) Field of Search .................. 384/40, 50, 52, 384/53, 55, 56, 57

(56) References Cited

U.S. PATENT DOCUMENTS

| | | |
|---|---|---|
| 575,152 A | 1/1897 | Fogg |
| 601,978 A | 4/1898 | Nevill |
| 636,726 A | 11/1899 | Hindmarsh |
| 689,970 A | 12/1901 | Horack |
| 723,075 A | 3/1903 | Thoms |
| 846,079 A | 3/1907 | Yost |
| 2,477,748 A | 8/1949 | Hutchins |
| 2,493,342 A | 1/1950 | Eldred et al. |
| 3,059,979 A * | 10/1962 | Hohl et al. .................. 384/57 |
| 3,113,807 A | 12/1963 | Polidor |
| 3,208,767 A | 9/1965 | Moulton |
| 3,221,691 A * | 12/1965 | Laxo ............................ 384/55 |
| 3,301,575 A | 1/1967 | Ryan et al. |
| 3,327,814 A | 6/1967 | Nickell |
| 3,342,534 A | 9/1967 | King |
| 3,459,441 A | 8/1969 | Hornsby |
| 3,591,906 A * | 7/1971 | Leiber ......................... 384/53 |
| 3,659,909 A | 5/1972 | Egbert |
| 3,790,233 A | 2/1974 | Polidor |
| 3,797,276 A | 3/1974 | Orain |
| 3,897,119 A | 7/1975 | McMurtrie |
| 3,964,765 A | 6/1976 | Zenser |
| 4,254,639 A | 3/1981 | Teramachi |
| 4,334,717 A | 6/1982 | Polidor |
| 4,509,386 A | 4/1985 | Kimberlin |
| 4,537,374 A | 8/1985 | Barnoin et al. |
| 4,705,491 A | 11/1987 | Andersson |
| 4,796,516 A | 1/1989 | Horvath .................. 92/165 R |
| 4,815,763 A | 3/1989 | Hartmann |
| 4,898,566 A | 2/1990 | Hakansson |
| 4,923,311 A | 5/1990 | Gibbs et al. .................. 384/49 |
| 4,971,344 A | 11/1990 | Turner |
| 5,044,648 A | 9/1991 | Knapp |
| 5,074,678 A | 12/1991 | Eberle |
| 5,106,207 A | 4/1992 | Fry ............................. 384/49 |
| 5,201,584 A | 4/1993 | Simons ....................... 384/49 |
| 5,320,374 A | 6/1994 | Farris et al. |
| 5,374,128 A | 12/1994 | Herbeck ..................... 384/49 |
| 5,492,414 A | 2/1996 | Gilbert ....................... 384/49 |
| 5,607,238 A | 3/1997 | Sherman ..................... 384/49 |
| 5,672,010 A | 9/1997 | MacNicol et al. ........... 384/42 |
| RE36,005 E | 12/1998 | Herbeck ..................... 384/49 |

FOREIGN PATENT DOCUMENTS

| | | |
|---|---|---|
| GB | 295316 | 4/1928 |
| IT | 416260 | 11/1946 |

* cited by examiner

*Primary Examiner*—Thomas R. Hannon
(74) *Attorney, Agent, or Firm*—Michael Best & Friedrich LLP

(57) ABSTRACT

A plurality of rollers is positioned between side members of a longitudinally-split, two-piece bearing race and a backup member that supports the two-piece bearing race along the length of side members. The backup member has angled surfaces such that ends of the rollers are closer to the angled surfaces than are intermediate portions of the roller. The two side members of the two-piece bearing race may be spread apart such that the angled surfaces of the backup member direct the side members of the two-piece bearing race toward the rollers to decrease the roller clearance and to create a preload.

14 Claims, 3 Drawing Sheets

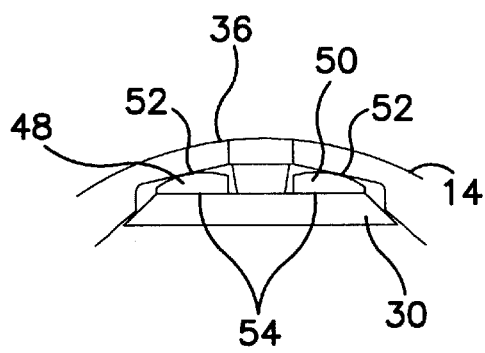
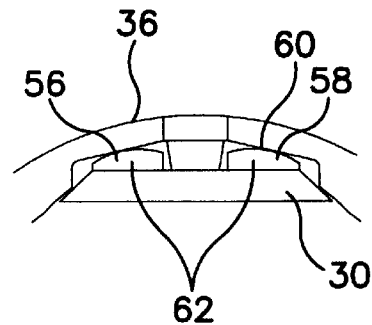
FIG. 3  FIG. 4
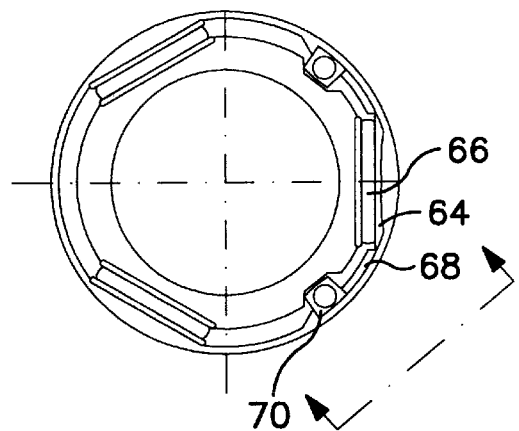
FIG. 5
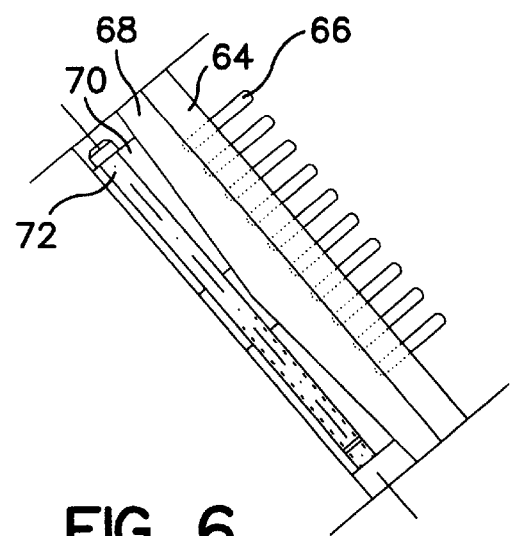
FIG. 6

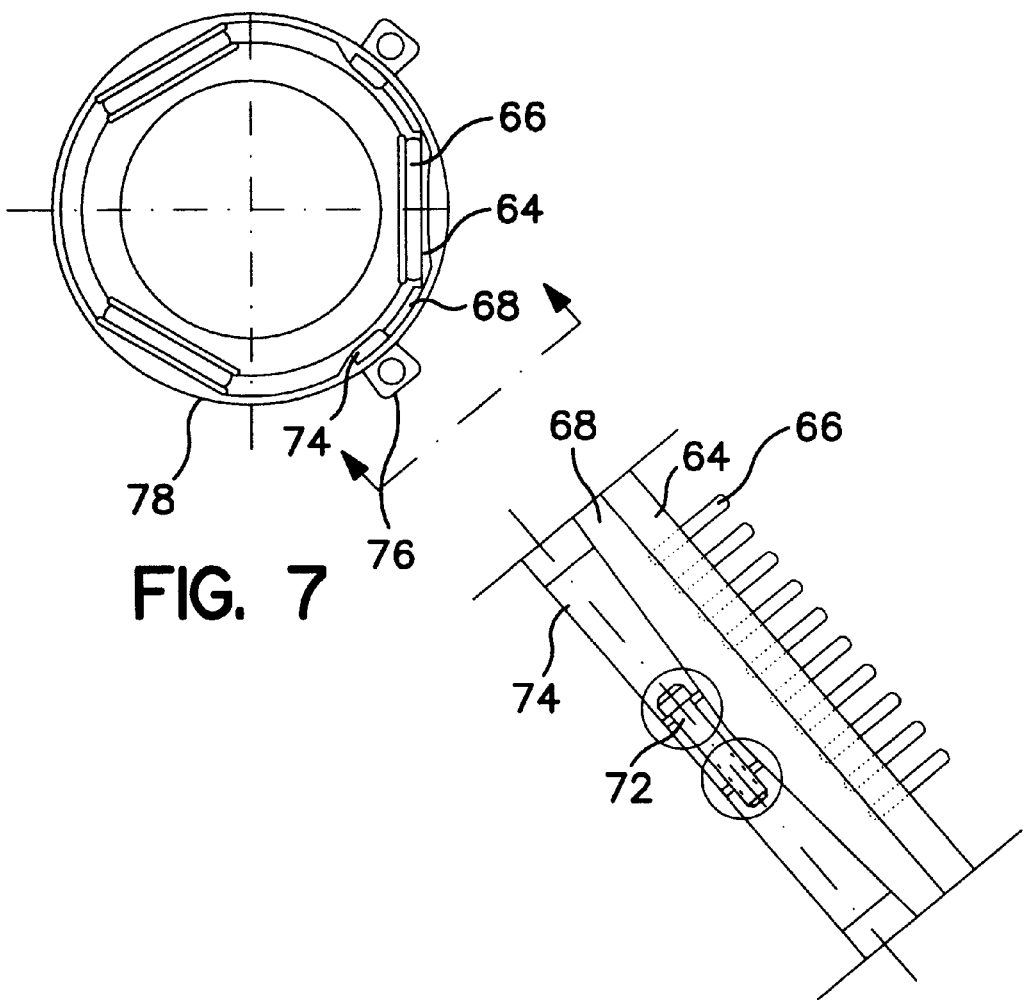

ADJUSTABLE, SELF-ALIGNING, LINEAR ROLLER BEARING

BACKGROUND OF THE INVENTION

This invention relates generally to linear roller bearings and, more particularly, to linear roller bearings with adjustment devices for providing alignment, preload or clearance.

Manufacturing tolerance in linear roller bearing complements and/or the desired relationship to fixed surfaces that backup the bearing races require an adjustment capability after assembly to achieve a desired preload or clearance condition, as required for a particular application.

The accepted method for providing adjustment after assembly of the bearing complement uses adjustment screws that bear upon the bearing race, or upon the backup surface that supports the bearing race. This method requires extreme care that the load (or clearance) is uniform along the entire length of the bearing race. Furthermore, the bearing race or backup surface must be of substantial thickness to have sufficient stiffness to prevent disparities between the contact points of the adjustment screws. This method cannot be used in applications where the total package envelope does not allow for ample thickness of the bearing race or backup surface, or when there is inadequate accessibility for the adjustment screws.

When thickness limitations prevent the use of adjustment screws, as just described, selective assembly of components must be used to achieve the desired preload or clearance condition required. Selective assembly requires that multiple sizes of bearing races and/or multiple diameters of rolling elements are available during assembly. For high precision assemblies, this method is time consuming and costly, requiring careful measurement of each component in order to correctly match the bearing assembly. Furthermore, for economic and practical reasons, the variety of components is such that instances occur which fall between the combinations of components available, leading to an under- or over-loaded condition of the final assembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a linear bearing comprising an elongated two-piece bearing race having two longitudinally extending side members. A plurality of rollers is positioned adjacent to the two-piece bearing race for rolling contact therewith, the rollers having a "clearance" with respect to the side members of the two-piece bearing race. A backup member supports the two-piece bearing race along the length of the side members, the backup member having angled surfaces such that ends of the rollers are closer to the angled surfaces than are intermediate portions of the roller. Spreading means is provided for spreading apart the two side members of the two-piece bearing race such that the angled surfaces of the backup member direct the side members of the two-piece bearing race toward the rollers to decrease the "clearance" with the rollers.

The foregoing and other aspects will become apparent from the following detailed description of the invention when considered in conjunction with the accompanying drawing figures.

BRIEF DESCRIPTION OF THE DRAWING FIGURES

FIG. 3 is a cross-sectional end view of a portion of a coaxial tubular arrangement similar to that of FIG. 1 illustrating an alternative configuration of a two-piece bearing race;

FIG. 4 is a cross-sectional end view of a portion of a coaxial tubular arrangement similar to that of FIG. 1 illustrating a second alternative configuration of a two-piece bearing race;

FIG. 5 is a cross-sectional end view of a coaxial tubular arrangement illustrating a second embodiment of the linear roller bearing of the present invention;

FIG. 6 is a longitudinal sectional view of a portion of the coaxial tubular arrangement of FIG. 5;

FIG. 7 is a cross-sectional end view of a coaxial tubular arrangement illustrating a third embodiment of the linear roller bearing of the present invention; and FIG. 8 is a longitudinal sectional view of a portion of the coaxial tubular arrangement of FIG. 7.

DETAILED DESCRIPTION

Figure 1:
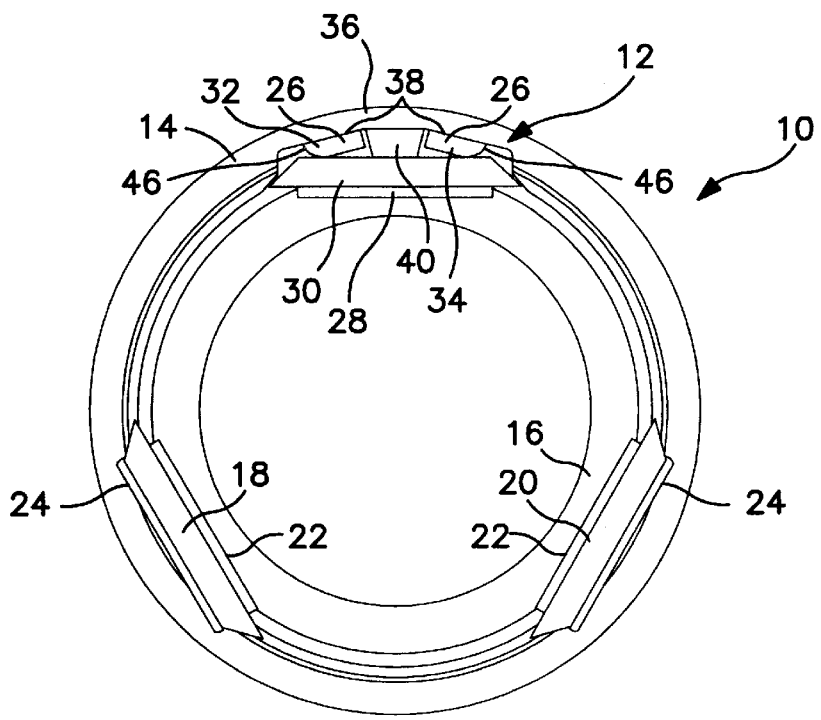
FIG. 1 is a cross-sectional end view of a coaxial tubular arrangement illustrating a preferred embodiment of the linear roller bearing of the present invention.
Figure 2:
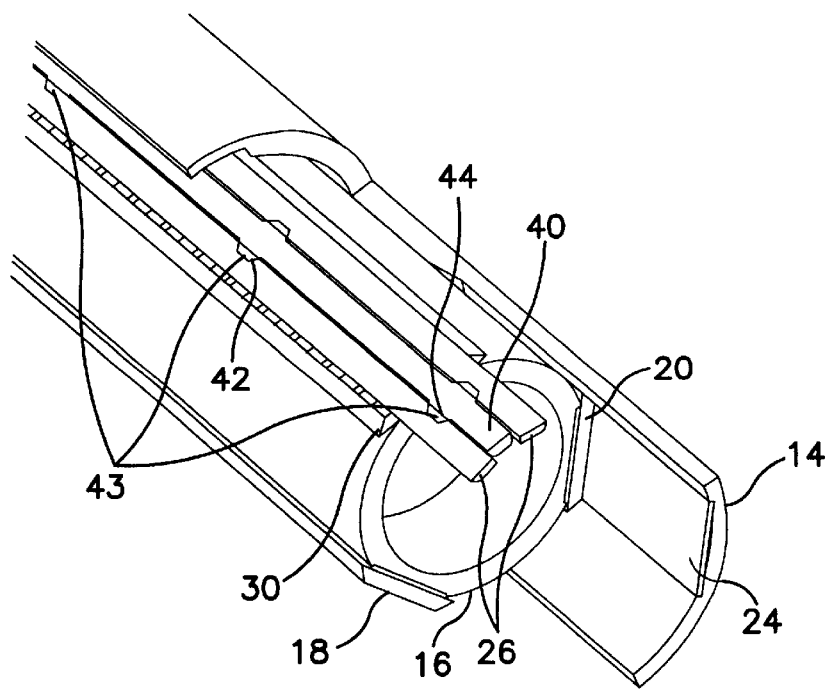
FIG. 2 is perspective view, partially cut away, of the coaxial tubular arrangement of FIG. 1.

Referring now to the drawings, FIGS. 1 and 2 show a coaxial tubular arrangement 10 including a linear roller bearing 12 illustrating a preferred embodiment of the present invention. The tubular arrangement 10 also comprises an outer tubular member 14, an inner tubular member 16, and linear bearings 18 and 20, that may be of conventional configuration. Inner and outer bearing races 22 and 24, respectively, of the linear roller bearings 18 and 20 provide rolling surfaces for rollers of linear roller bearings 18 and 20. Alternatively, if the tubular members are made of suitable material, integral inner and outer bearing raceways may be used in place of bearing races 22 and 24.

Linear roller bearing 12 comprises a two-piece bearing race 26 as an outer bearing race and a one-piece inner bearing race 28 with a plurality of rollers retained in a bearing cage, indicated as roller assembly 30, therebetween for rolling contact therewith. The rollers have a "clearance" with respect to side members 32 and 34 of two-piece bearing race 26 that may be positive, indicating a conventional clearance condition, or may be negative, indicating an interference condition, effecting a preload of the linear roller bearing 12. For convenience, the side members 32 and 34 may be designed to be identical.

A backup member 36, in this application a portion of the outer tubular member 14, supports the two-piece bearing race 26 along the length of the side members 32 and 34. Angled surfaces 38 of the backup member 36 are formed as a V-shaped groove extending longitudinally along the roller assembly 30 such that ends of the rollers are closer to the angled surfaces 38 than are intermediate portions of the rollers. The two side members 32 and 34 of the two-piece bearing race 26 are spread apart by spreading means such that the angled surfaces 38 causes a camming, or wedging, engagement that directs the side members of the two-piece bearing race toward the rollers to decrease the "clearance" with the rollers.

As illustrated in FIG. 2, the spreading means may comprise a longitudinally extending adjustment rod 40 extending between the side members 32 and 34 of the two-piece bearing race 26 and multiple angled surfaces 42, distributed along the length of the adjustment rod 40, that are engageable with corresponding angled surfaces 44 of the side members 32 and 34. This configuration is such that an axial movement of the adjustment rod 40 causes the side members 32 and 34 to spread apart, substantially circumferentially with respect to the tubular arrangement 10 to decrease the "clearance".

As illustrated in FIGS. 1 and 2, the adjustment rod 40 may have a trapezoidal or rectangular cross section and may have trapezoidal-shaped lateral extensions 43, distributed along the length of the adjustment rod 40, that provide the multiple angled surfaces 42. These lateral extensions have angled surfaces opposite angled surfaces 42 to allow the adjustment rod to engage the side members 32 and 34 by movement in an opposite axial direction. However, this configuration and this two-directional operation is not required for the practice of the present invention. Axial movement of the adjustment rod 40 may be effected by a screw, by a rotary cam, or by other mechanical means.

The side members 32 and 34 in the embodiment of FIGS. 1 and 2 include a convex portion 46 adjacent to the rollers to provide a convex raceway for the rollers of roller assembly 30. This convex portion 46 allows the rollers of the roller assembly 30 to engage the raceway even though the rollers may be misaligned, providing a self-alignment feature. The contact between the rollers and the side members 32 and 34 is a plurality of point contacts, that is, each roller contacts each side member 32 or 34 at a single point.

When such point contacts do not provide sufficient load carrying capacity, side portions 48 and 50 may be provided with a convex surface 52 adjacent to the backup member 36 and a generally flat raceway surface 54 to allow a substantial percentage of roller length to contact the races, as illustrated in FIG. 3, while maintaining the self-alignment feature described above. Alternatively, side portions 56 and 58 may have a generally flat surface 60 adjacent to the backup member 36 and a generally flat raceway surface 62, as illustrated in FIG. 4, providing additional load carrying capacity without the self-alignment feature.

The present invention is not limited to applications having a three bearing arrangement, a coaxial assembly, or a single embodiment of the invention per assembly. The present invention is applicable to assemblies using two, four or more linear roller bearings. Furthermore, the linear roller bearing of the present invention may be utilized in each linear bearing position, compensating for angular mis-alignments of the race backup surfaces which would otherwise impair the assembly. Additionally, other configurations of the adjustment rod 40 are anticipated that would effect the same or similar compound movement of the side portions of the two-piece race.

Alternatively, the cam (or wedge) mechanism may be located laterally outside the two-piece race (not between the two side members) to take advantage of additional space that may be available. FIGS. 5 through 8 illustrate two such arrangements. In FIGS. 5 and 6, side members 64 of a two-piece bearing race project laterally beyond the rollers 66 and make contact with a wedge member 68. Two tapered cams 70 engage the wedge member such that the side members 64 are spread apart or drawn together by a screw 72. FIGS. 7 and 8 illustrate a similar arrangement wherein the cams 74 are simple stamped parts with tabs 76 projecting through apertures in the outer tubular member 78 to accept an adjusting screw 72.

The present invention is suitable for applications with limited space, while also providing simplified assembly. The amount of adjustment allows for standard manufacturing tolerances, further reducing the cost and complexity of the fabrication and assembly process.

Having described the invention, what is claimed is:

1. A linear roller bearing comprising:

a two-piece bearing race, the two-piece bearing race being elongated and having two longitudinally extending side members;

a plurality of parallel rollers positioned adjacent to the two-piece bearing race for rolling contact therewith, the rollers having a "clearance" with respect to the side members of the two-piece bearing race;

a backup member supporting the two-piece bearing race along the length of the side members, the backup member having angled surfaces such that ends of the rollers are closer to the angled surfaces than are intermediate portions of the rollers; and spreading means for spreading apart the two side members of the two-piece bearing race such that the angled surfaces of the backup member direct the side members of the two-piece bearing race toward the rollers to decrease the "clearance" with the rollers.

2. The linear roller bearing according to claim 1, wherein the spreading means comprises a wedge member.

3. The linear roller bearing according to claim 2, wherein the wedge member comprises an adjustment rod extending lengthwise between the side members of the two-piece bearing race and having multiple angled surfaces distributed along the length of the rod for engagement with the side members of the two-piece bearing race.

4. The linear roller bearing according to claim 2, wherein the wedge member is movable by a mechanical actuator to effect the spreading apart of the side members of the two-piece bearing race.

5. The linear roller bearing according to claim 1, wherein the side members of the two-piece bearing race have a generally flat portion adjacent to the backup member and a convex raceway surface adjacent to the rollers to allow for angular misalignment of the rollers with respect to the backup member.

6. The linear roller bearing according to claim 1, wherein the side members of the two-piece bearing race have a generally flat raceway portion adjacent to the rollers and a convex portion adjacent to the backup member to allow for angular misalignment of the rollers with respect to the backup member.

7. The linear roller bearing according to claim 1, wherein the side members of the two-piece bearing race have a generally flat portion adjacent to the backup member and generally flat raceway portion adjacent to the rollers.

8. The linear roller bearing according to claim 1, wherein the "clearance" of the rollers with respect to the side members of the two-piece bearing race is negative, thereby defining an interference condition and effecting a preload on the linear roller bearing.

9. The linear roller bearing according to claim 1, wherein the spreading means comprises an actuating means positioned laterally with respect to the side members of the two-piece bearing race such that actuation of the actuating means draws the two side members apart.

10. The linear roller bearing according to claim 9, wherein the side members extend laterally beyond the rollers and wherein the actuating means comprises a screw engageable to move one side member of the two-piece bearing race away from the other side member of the two-piece bearing race.

11. The linear roller bearing according to claim 10, wherein the screw extends lengthwise with respect to the two-piece bearing race such that the screw can be advanced to spread apart the two side members of the two-piece bearing race.

12. The linear roller bearing according to claim 10, wherein the screw extends lengthwise with respect to the two-piece bearing race such that the screw can be withdrawn to spread apart the two side members of the two-piece bearing race.

13. The linear roller bearing according to claim 9, wherein the actuating means comprises a cam that is rotatable to move a wedge member axially to effect spreading apart of the side members of the two-piece bearing race.

14. The linear roller bearing according to claim 1, wherein the side members of the two-piece bearing race are substantially the same such that each comprises half the two-piece bearing race.

* * * * *